United States Patent [19]

Schwartz

[11] 4,293,182
[45] Oct. 6, 1981

[54] ELECTRICAL CONNECTOR BODY AND METHOD OF MAKING SAME

[75] Inventor: Lawrence Schwartz, Huntington Beach, Calif.

[73] Assignee: International Telephone and Telegraph Corporation, New York, N.Y.

[21] Appl. No.: 113,610

[22] Filed: Jan. 21, 1980

[51] Int. Cl.³ .......................................... H01R 13/504
[52] U.S. Cl. ............................ 339/275 R; 339/218 R
[58] Field of Search ............... 339/143 R, 143 C, 111, 339/276 C, 59 R, 59 M; 174/73 SC; 264/250, 255, 275, 277

[56] References Cited

U.S. PATENT DOCUMENTS

| | | | |
|---|---|---|---|
| 2,027,483 | 1/1936 | Keller | 264/255 |
| 3,243,756 | 3/1966 | Reute et al. | 174/73 R X |
| 4,203,641 | 5/1980 | Siebens | 339/143 C |

Primary Examiner—Eugene F. Desmond
Attorney, Agent, or Firm—Thomas L. Peterson

[57] ABSTRACT

A unitary one-piece electrical connector body is disclosed having an outer shell portion surrounding an inner insulator portion. The outer shell portion is formed of an insulator containing a conductive filler. The connector body is formed by a double shot molding process using a single cavity mold.

2 Claims, 4 Drawing Figures

ELECTRICAL CONNECTOR BODY AND METHOD OF MAKING SAME

BACKGROUND OF THE INVENTION

The present invention relates generally to an electrical connector and, more particularly, to a novel unitary connector body having a conductive shell, and a method of making the same.

Typically, an electrical connector comprises an insulator containing a plurality of contacts, and a separate metal shell surrounding the insulator. The shell provides grounding and RF shielding for the connector. Since the shell and insulator are separate parts, it will be appreciated that the cost of assembling the connector makes the connector more expensive than one-piece plastic connectors without metal shells. However, the latter connectors are unsuitable when grounding and shielding are required. Furthermore, sometimes voids occur between the insulator and the shell in the two-piece connector in which moisture may become entrapped thereby impairing the operating characteristics of the connector.

Accordingly, it is one object of the present invention to provide a unitary, one-piece electrical connector body having a conductive shell portion for providing grounding and/or RF shielding.

As will be seen as this description proceeds, the connector body of the present invention is made by the use of a double shot molding process, which broadly speaking is not new. Double shot molding, sometimes also referred to as dual color molding, has been used previously in the connector art as well as in the manufacture of buttons for keyboards, for example. With respect to the pertinent connector prior art, reference is made to British Pat. No. 968,707 which discloses a unitary connector insulator having a hard contact mounting portion with a relatively soft resilient grommet portion integral therewith. The mold assembly used to produce the insulator initially contains a "dummy" plate and a first mold cavity plate. A first shot of insulating material is made into the first mold cavity plate to form the contact mounting portion of the insulator. The dummy plate is then removed and replaced with a second mold cavity plate into which a second shot of insulating material is made to form the grommet. Thus, the mold assembly must be disassembled in order to form the unitary insulator body.

It is a further object of the present invention to provide a novel double shot molding process for forming the unitary electrical connector body of the invention, which does not require disassembly of a mold during the two steps of injecting molding compound into the mold.

An electrical connector made by the use of a dual color molding process is disclosed in U.S. Pat. No. 3,998,512 to Anhalt et al. In FIG. 5 of the Anhalt patent, there is disclosed a watch connector comprising a plurality of conductive silicone rubber strips integral with a non-conductive silicone rubber backing sheet. The conductive strips from the contacts of the connector. The connector does not incorporate a conductive shell surrounding an insulator containing contacts as does the connector of the present invention.

SUMMARY OF THE INVENTION

According to one aspect of the present invention, there is provided an electrical connector body comprising an inner portion and a shell portion surrounding the insulator portion. The inner portion has a plurality of contact passages therethrough. One of said portions is an insulator. The material of the body is continuous from the insulator portion to the other of said portions so that the body is a unitary, one-piece structure. Said other portion contains a conductive filler. In the preferred embodiment, the material of the shell contains the conductive filler so that the shell may be utilized for grounding or RF shielding, or both.

According to another aspect of the invention, there is provided a method for making the aforementioned connector body in which there is utilized a first insulation material and a second insulation material containing a conductive filler. One of the materials is injected into a mold cavity having a movable core therein spaced from the wall of the cavity defining therebetween a shell mold cavity. The core is then retracted in the cavity a predetermined length to provide an inner mold cavity within the thus-formed shell portion of the connector body. The other material is then injected into the inner mold cavity to form the inner portion of the connector body. The first and second materials are in substantially uncured and liquid form when injected and are curable to a solid form. Said other material is injected so as to flow into intimate contact with said one material while said one material is in substantially an uncured condition. The injected materials are allowed to cure together in the mold cavity to form the unitary electrical connector body of the invention.

DESCRIPTION OF THE PREFERRED EMBODIMENT

Figure 1:
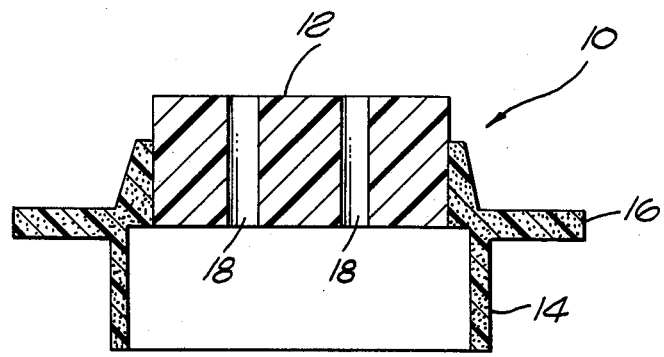
FIG. 1 is a longitudinal sectional view through the connector body of the present invention.

Referring now to FIG. 1 of the drawings in detail, the unitary, one-piece electrical connector body of the present invention, generally designated 10, comprises an inner cylindrical insulator portion 12 surrounded by an outer cylindrical shell portion 14. The shell portion embodies an outwardly extending mounting flange 16. The insulator portion 12 contains a plurality of axially extending contact passages 18, two being shown by way of example only. Normally, the insulator contains a substantially larger number of contact passages. The passages have been shown as being cylindrical for purposes of illustration only. It will be appreciated that the contact passages will normally have a more complex configuration facilitating the mounting of electrical contacts therein or contact retention clips for retaining contacts in the insulator.

The shell portion 14 of the body 10 is formed of an insulation material containing a conductive filler. The insulator and shell portions of the body are made in accordance with the method of the present invention so that the insulation material is continuous from one portion of the connector body to the other. These two portions are molded together in the same mold in such a way that connection between the two parts of the connector body may be considered as being molecularly continuous, so that no voids exist between the two portions of the body and no glue or other foreign bonding substances are present therebetween.

The insulation materials used in the portions 12 and 14 of the connector body have the same base polymer and, preferably, are identical materials. By way of example only, the insulation material utilized in both the insulator portion 12 and shell portion 14 of the connector body may be a polysulfone type polymer or 30 percent glass loaded 6/6 nylon. The conductive filling in the insulation material which forms the shell portion 14 of the body may be graphite, metal particles, metalized glass beads, or a combination thereof. The amount of conductive filler in the shell portion 14 of the connector body depends upon the electrostatic discharge and RF shielding desired. By way of further example, the insulation material forming the shell portion 14 may contain 30 to 40 percent by weight of the conductive filling material.

Figure 2:
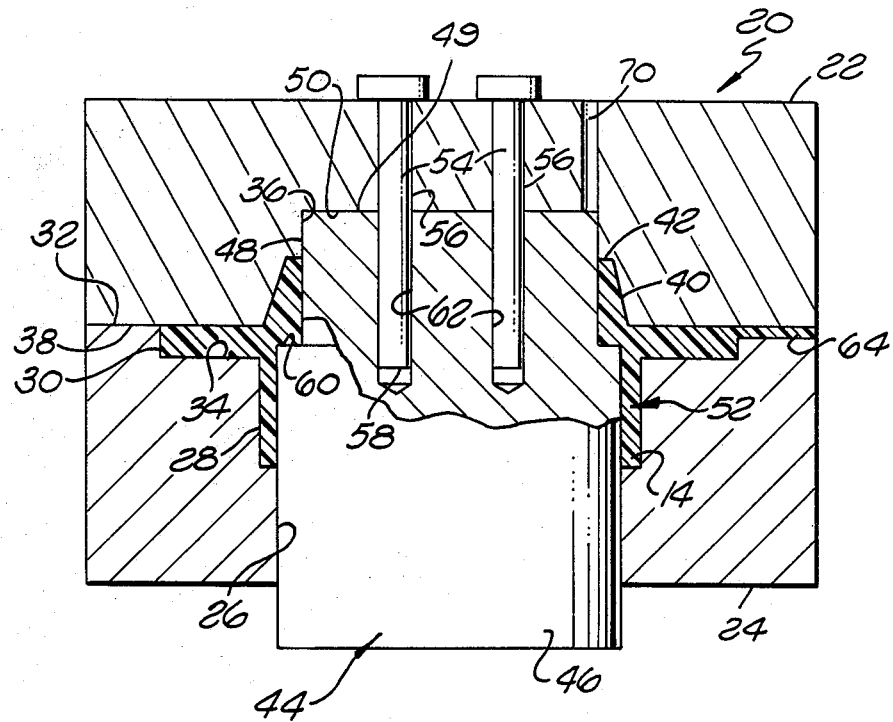
FIG. 2 is a partial longitudinal sectional view through the mold assembly of the present invention with the core therein shown in position to permit the molding of the shell portion of the connector body.
Figure 3:
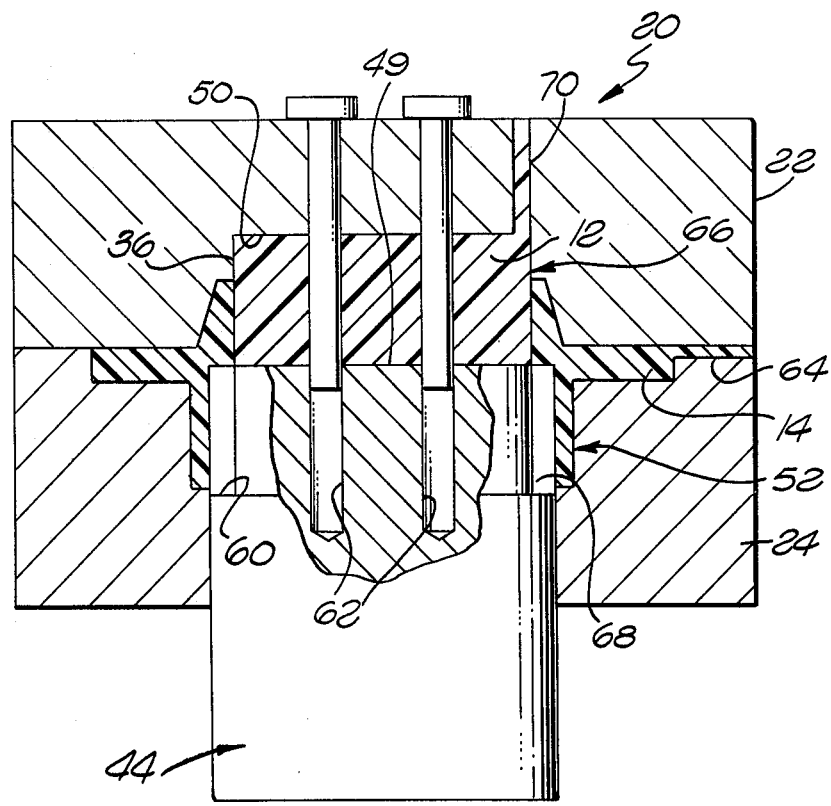
FIG. 3 is a partial sectional view similar to FIG. 2 but showing the core in a retracted position to allow the injection of the material to form the insulator portion of the body.
Figure 4:
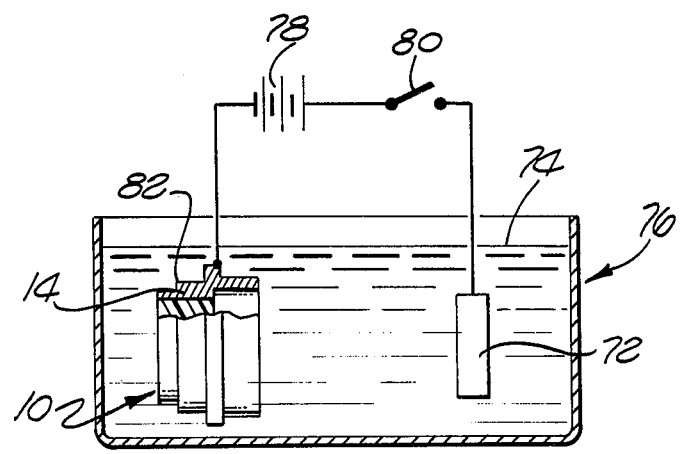
FIG. 4 is a schematic illustration of an electrolysis cell for plating the shell portion of the connector body of the invention.

The mold assembly for making the connector body 10 is illustrated in FIGS. 2 and 3. It will be understood that different mold structures may be employed for accomplishing the same results, with contemplated production molds including multiple cavities and automatic actuating means.

Referring now to FIG. 2 the mold assembly, generally designated 20, comprises an upper plate 22 and lower plate 24. The lower plate 24 has a central cylindrical bore 26 therethrough. The bore includes a first counterbore 28 and a second counterbore 30 opening at the upper face 32 of the plate, providing an annular surface 34 between the counterbores. The upper plate 22 embodies a cylindrical recess 36 coaxial with the bore 26 and opening at the bottom face 38 of the plate. The diameter of the recess 36 is less than the diameter of the bore 26. The recess 36 has a counterbore 40 defining an annular surface 42 therebetween.

A vertically movable core 44 is provided in the mold assembly. The core includes a lower cylindrical section 46 and an upper smaller diameter cylindrical section 48. When the upper surface 49 of the core 44 is positioned against the bottom 50 of the recess 36 in the upper plate 22 of the mold, the walls of the counterbores 28, 30 and 40 and the outer surface of the core 44 define a mold cavity 52 for the shell portion of the connector body.

A pair of core pins 54 are mounted in vertical bores 56 in the upper plate 22. The pins have a length such that the lower ends 58 extend below the annular shoulder 60 between the upper and lower sections of the core 44 when the core is in the position illustrated in FIG. 2. The pins are slidably received in vertical bores 62 in the core 44 aligned with the bores 56. The core pins serve to form the contact passages 18 as will be seen later. The core pins may have any configuration depending upon the shape of the passage 18 desired in the connector body 10. Cylindrical core pins have been shown herein for purposes of illustration only.

A radially extending groove 64 is formed in the upper surface 32 of the lower plate 24 leading from the mold cavity 52 to the exterior of the plate.

The core 44 of the mold assembly is retractable from the position illustrated in FIG. 2 to a lower position as illustrated in FIG. 3 wherein the upper surface 49 of the core is spaced from the bottom 50 of the recess 36 a distance corresponding to the axial length of the insulator portion 12 of the connector body, thereby providing a second mold cavity 66 for forming such insulator portion. It will be appreciated that the core 44 must not be lowered any greater than the distance between the annular shoulder 60 on the core and the upper surface 49 thereof to avoid communication between the cavity 66 and the annular space 68 illustrated in FIG. 3. A molding material injection port 70 communicates from the cavity 66 to the exterior of the upper plate 22 of the mold assembly. It will be noted that the core pins 54 are sufficiently long so that they remain within the bores 62 in the core 44 when the core is in its retracted position so that no molding material may flow into the bores when injected through the port 70 into the cavity 66.

To perform the method of the present invention, an insulation material containing a conductive filler, as hereinbefore described, is injected through the port 64 into the cavity 52, with the core 44 in the position in the mold assembly as shown in FIG. 2, to form the shell portion 14 of the connector body 10. The shell portion is retained in the mold only for a short interval of time, sufficient to provide a thin "skin" on the molded part so that the core 44 may be retracted without damaging the part, but insufficient to provide any substantial cure thereof. Thus, when the second molding step, as illustrated in FIG. 3, is effected the first molded portion 14 of the connector body will be in a substantially or primarily uncured condition, but will be at curing temperature and will be undergoing the heat-curing process.

When the core 44 is retracted to the position illustrated in FIG. 3, insulation material (without a conductive filler) is injected into the cavity 66 through the port 70. Because of the substantially uncured condition of the material of the shell portion 14 at this time, the material of the insulator portion 12 will become intimately fused and commingled with the material of the shell portion so that when curing is complete, the molecular structure of the material from one portion of the body to the other will be continuous.

Both portions of the body are retained in the mold assembly 20 until curing of the entire body is complete, at which time the mold plates 22 and 24 are separated and the completed connector body is removed from the mold, with the core 44 being withdrawn from the bore 26 and the core pins 54 withdrawn from the bores 56 in the upper plate.

Since the material of the connector body is continuous from the insulator portion 12 to the shell portion 14 thereof, there are no interfaces between the two portions between which moisture could become entrapped. Thus, the method of the present invention provides a unitary, one-piece connector body with a conductive shell for providing grounding and low level RF shielding for the completed connector.

For higher RF shielding, it is desirable to provide a conductive coating on the shell portion 14 of the connector body. Such coating may be silver, copper, or any other suitable conductor applied by arc spraying, painting, or vacuum deposition. However, such processes would require the masking of the insulator portion 12 of the connector body. In the preferred embodiment of the present invention, such coating may be provided electrolytically by immersing the connector body in an electrolyte 74 of an electrolysis cell 76, and connecting the shell portion 14 of the body to an electrode 72 through a power source 78. By the choice of a suitable electrolyte 74 and electrode material 72, upon closing the switch 80 in the electrolysis circuit the material of the electrode 72 will be deposited in the form of a metallic coating 82 on the shell portion 14 of the connector body. Thus, in the electrolysis process, no masking of the insulator portion of the connector body is required, and all of the exposed surfaces of the shell portion of the body will be coated with a conductive layer.

While the mold assembly 20 has been described as providing circular walls to define the mold cavities, it will be appreciated that the cavities may have different shapes, such as rectangular. Other changes in the shape of the mold may be made depending upon the desired configuration of the resulting connector body.

While the invention has been described as providing a connector having an inner insulator portion with an outer conductive shell portion, it will be appreciated that the materials for the inner and outer portions may be reversed so that the inner conductive portion will provide common grounding for the contacts and the outer portion will provide an insulator shell.

I claim:

1. A method of making a unitary electrical connector body having a shell portion surrounding an inner portion of predetermined axial length comprising the steps of:

providing a first insulation material and a second insulation material containing a conductive filler;

providing a mold cavity having a side wall and an end wall;

inserting a core into said cavity spaced from said side wall defining therebetween a shell mold cavity, with said core closing said end wall of said cavity;

thereafter injecting said second material into said shell mold cavity while said core is in said cavity to form the shell portion of said connector body;

partially retracting said core in said cavity said predetermined length to provide an inner mold cavity within said shell portion defined by the inner surface of said shell portion, said cavity end wall and the inner end of said core;

thereafter injecting said first material into said inner mold cavity to form the inner portion of said connector body;

said first and second materials being in substantially uncured, liquid form when injected and being curable to a solid form, said first material being injected so as to flow into intimate contact with said second material while said second material is in substantially uncured condition; and curing said materials together in said mold cavity to form said unitary electrical connector body.

2. A method is set forth in claim 1 including the additional steps of:

prior to injecting said first material into said inner mold cavity, inserting core pins through openings in said end wall of said mold cavity into corresponding bores in said core a distance greater than said predetermined length; and withdrawing said core pins from said mold cavity after said materials cure.

* * * * *